United States Patent Office 3,453,036
Patented July 1, 1969

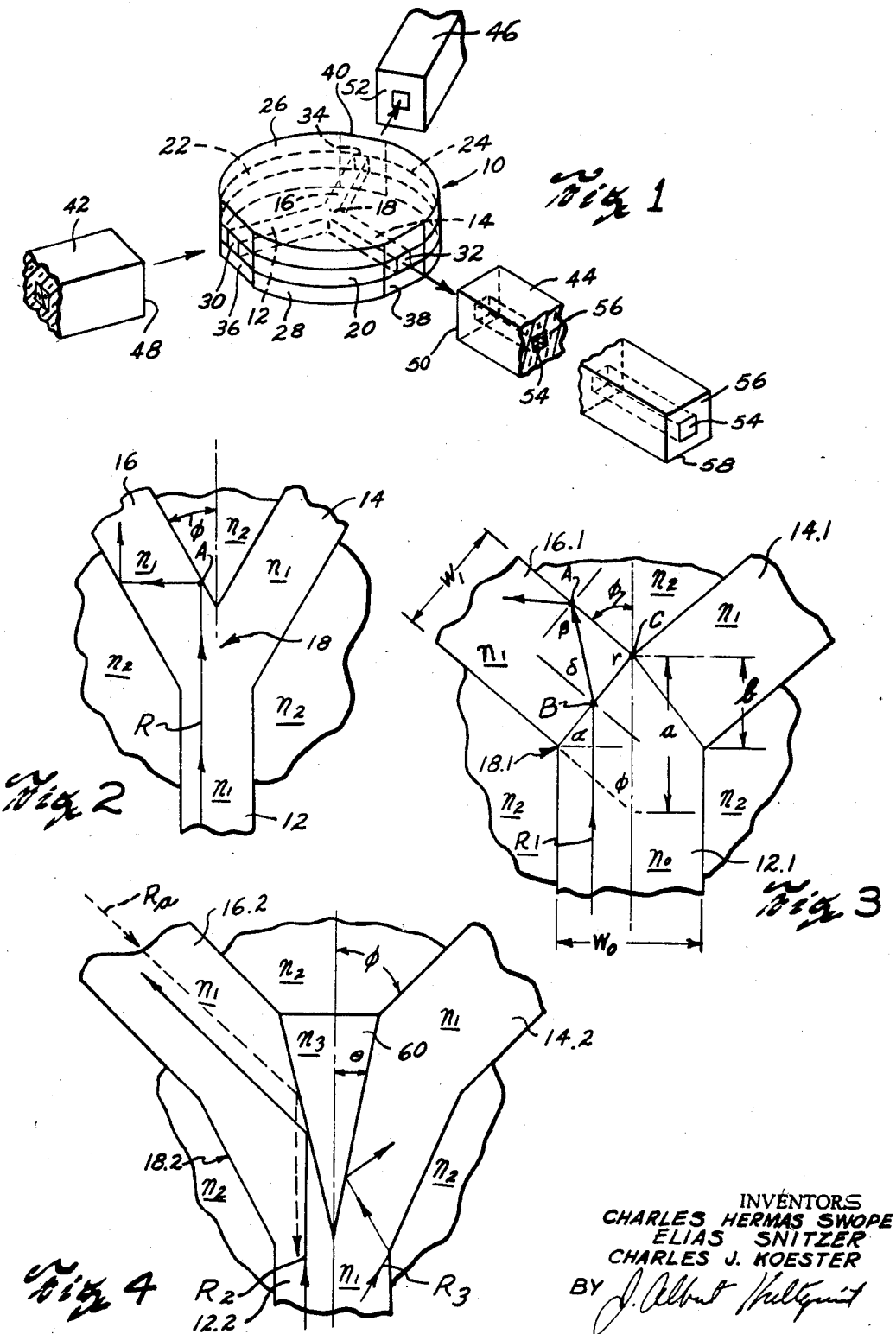

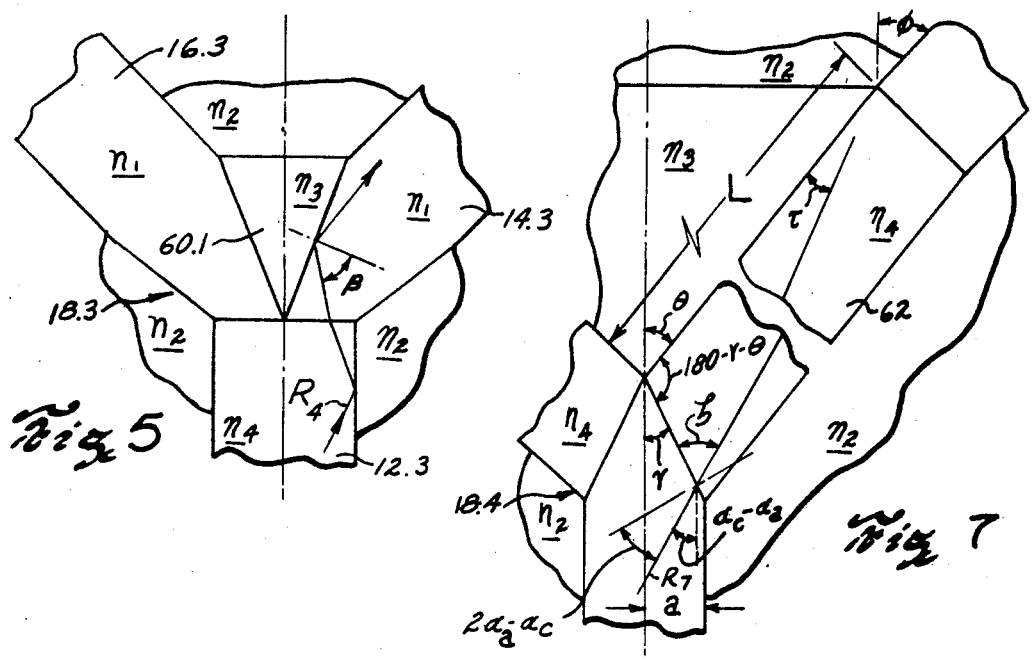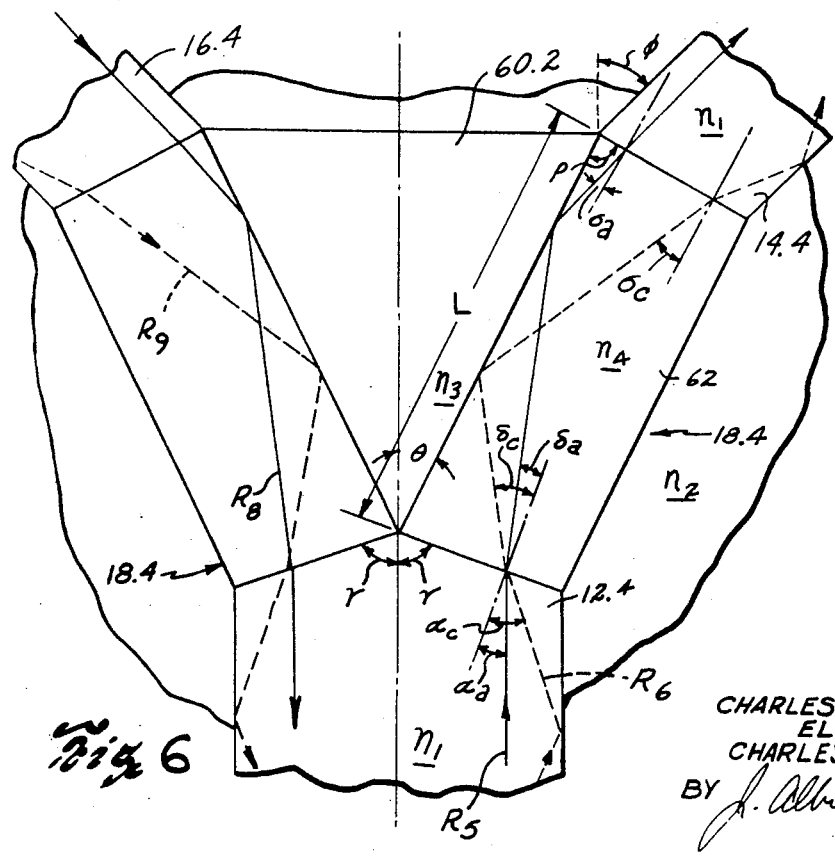

3,453,036
OPTICAL JUNCTION FOR LIGHT CONDUCTORS
Charles Hermas Swope, Southbridge, and Elias Snitzer, Sturbridge, Mass., and Charles J. Koester, South Woodstock, Conn., assignors, by mesne assignments, to American Optical Corporation, a corporation of Delaware
Filed Mar. 31, 1966, Ser. No. 539,149
Int. Cl. G02b 5/14
U.S. Cl. 350—96    6 Claims

ABSTRACT OF THE DISCLOSURE

An optical junction device having three long and thin light-conducting channel members arranged in a Y formation with one end of each optically junctioned to a corresponding end of the other. The members are formed of a material having a preselected high index of refraction and surrounded by material of lower refractive index whereby each channel member conducts light according to the principles of total internal reflection.

---

This invention relates to couplers for joining plural light paths in optical systems and has particular reference to optical junction devices.

The present invention deals principally with the dividing and/or combining of light for effecting distribution of light between a number of discrete paths or collection of light from multiple paths to a lesser number or single path in such circuitry as, for example, that which may be employed to transmit light between logic elements in computer technology or similar sciences.

Accordingly, a general object of the invention is to provide for highly efficacious yet simple and economical coupling of light paths in light-transmitting circuitry.

Another object is to provide for efficient junctioning of plural optical paths for conducting light from one to a plurality of other such paths or vice versa in an optical circuitry; and A further object is to provide for efficient transmittance of light in multijunction light-transmitting circuitry.

To attain the aforesaid objects and others which may appear from the following description, in accordance with principles of our invention, we provide an optical coupling device embodying three light-conducting channels each having one end junctioned to the corresponding one ends of the others and all extended radially from such junction in the figure of a Y. The channels are each formed of a light-conducting material such as glass having a relatively high refractive index and are surrounded by a glass or equivalent material having a lower refractive index. Thus, by virtue of the principles of total internal reflection, light caused to enter an outermost end of one such channel, which will be referred to hereinafter as the base, will propagate to the junction where it will become divided into two components, one being received by each of the remaining two channels or arms and conducted to their respective outermost ends. Conversely, light caused to simultaneously enter the two arms of the device will be combined at the junction and conducted by the base to its outermost end.

It will become readily apparent from the following detailed description that in order to achieve the foregoing it is necessary to maintain the condition for total internal reflection before and after the junction of the channels in the coupling device. This involves various parameters including careful selection of indices of refraction of materials from which components of the optical junction devices are fabricated, control of width and angular relationship of the channels and attention to constructional details of the channel junction itself.

Accordingly, the present invention will be more fully understood by reference to the following detailed description which is accompanied by a drawing in which
FIG. 1 illustrates a type of optical junction coupling device and associated optical circuitry useful in understanding the present invention;
FIGS. 2, 3, 4, 5 and 6 are fragmentary diagrammatic illustrations of various embodiments of the present invention; and
FIG. 7 illustrates supplementary details of the embodiment of the invention shown in FIG. 6.

A fundamental requirement in an optical logic technology is that optical systems can be easily and efficiently coupled. Although optical fibers per se are natural candidates for one-to-one connections, the dividing or combining of light in light-transmitting circuitry requires an optical junction. Accordingly in FIG. 1 there is illustrated coupler 10 embodying such a junction.

Coupler 10 basically comprises three long and thin light-conducting channel members 12, 14 and 16 arranged triaxially in a Y formation with their corresponding one ends joined so as to form junction 18. Channel members 12, 14 and 16 are each constructed of glass having a relatively high refractive index and are surrounded by glass pieces 20, 22, 24 and glass cover plates 26, 28 all of which have a lower refractive index than the channel members. The channel members, pieces 20, 22, and 24 and plates 26, 28 are all fused together as a unit.

Outermost ends 30, 32 and 34 of channel members 12, 14 and 16, together with adjacent portions of their surrounding glasses, are ground and optically polished to form flat faces 36, 38 and 40 each disposed perpendicularly to the axis of its respective channel member 12, 14, or 16. Thus, coupler 10 is adapted to optically interconnect a plurality of light conductors in an optical circuit by receiving light-emitting or light-receiving ends of such conductors at faces 36, 38 and 40. Exemplary conductors in the form of long and thin light pipes 42, 44 and 46 are, for clarity of illustration, shown in FIG. 1 as having their ends 48, 50 and 52 spaced from faces 36, 38 and 40. Ends 48, 50 and 52 of the light pipes would ordinarily be placed directly against faces 36, 38 and 40 so as to become optically junctioned by coupler 10. It may be desirable to interpose a thin layer of lens cement or oil of a refractive index approximately equal to that of the cores of the light pipes to more efficiently couple them to the channels in coupler 10. Furthermore, and only for the purpose of illustration, light pipes 42, 44 and 46 are shown as each being in the form of a clad optical fiber comprising a single core 54 of light-conducting material of relatively high refractive index surrounded by a material 56 having a lower index of refraction than that of the core. Light pipes 42, 44 and 46 may, alternatively, each comprise a multiplicity of very thin individually clad fibers all secured together in side-by-side relationship with each other or a strip or ribbon of light-conducting material coated with a light-insulating medium. All such light pipes and their principles of operation in conducting light by total internal reflection are well known in the art and, accordingly, should not require further detailed description herein.

Coupler 10 may be formed to any contour, size and shape commensurate with the particular size and/or shape of the light-transmitting circuitry (i.e., light pipes 42, 44, 46). Furthermore, while only one junction device (coupler 10) is illustrated in FIG. 1, it should be understood that a multijunction optical network may be fabricated by incorporating additional similar couplers in the circuitry such as, for example, by placing another coupler against end 58 of light pipe 44 with a channel member such as 12, 14 or 16 of the additional coupler in coaxially aligned relationship with core 54.

As already mentioned, in order to make effective low-loss Y junction couplers, it is necessary to maintain the condition for total internal reflection throughout all channel members 12, 14 and 16 and junction 18. This involves parameters illustrated in FIG. 2 which depicts a simplified form of junction 18. There, all channel members 12, 14 and 16 are formed of glass having the same index of refraction $n_1$ and are surrounded by glass having a lower index of refraction $n_2$.

The condition required for total internal reflection of a ray of light R traveling toward junction 18 and parallel to the axis of the base of the Y (channel member 12) is calculated as follows:

The angle of incidence of ray R at point A on the interface of an arm of the Y (channel member 16) is $90° - \phi$ where $\phi$ is the half angle between arms 16, 14.

Therefore, $n_1 \sin(90° - \phi) \geq n_2$ or $\cos \phi \geq \frac{n_2}{n_1}$.

Thus, for example, if channel members 12, 14 and 16 of coupler 10 are each formed of a flint glass having a refractive index $n_1$ of 1.762 and the surrounding materials are crown glass having a refractive index $n_2$ of 1.510, the condition for achieving total internal reflection in channel members 12, 14 and 16 is that $\phi \leq 31°$.

The symbols $\geq$ and $\leq$ used herein are intended to refer to the relations of quantities before such symbols as respectively being—not less than—and—not more than—the quantities appearing thereafter.

In FIG. 3, another way in which to fabricate the Y junction of coupler 10 is illustrated wherein the condition for total internal reflection may be achieved with greater spread (i.e., a larger angle $\phi$ between channel members 14.1 and 16.1 at junction 18.1. Here, the base (channel member 12.1) and arms (channel members 14.1 and 16.1) of junction 18.1 may have different indices of refraction as indicated by $n_0$ and $n_1$ respectively and further may have different widths as indicated by $w_0$ and $w_1$. Both such parameters will influence the amount of deviation received by a ray of light $R_1$ on passing through the interface between base and arm at, for example, point B in FIG. 3. Refractive index of the glass surrounding junction 18.1 and channel members 12.1, 14.1, 16.1 is indicated as $n_2$ in FIG. 3.

The maximum allowable angle $\phi$ ($\phi$ max.) in the embodiment of the invention illustrated in FIG. 3 as a function of $n_0$, $n_1$, $n_2$, $w_0$ and $w_1$ is derived as follows wherein various angles, points and distances referred to are identified in FIG. 3 by like symbols:

Accordingly, $$\text{distance } a = \frac{w_1}{\sin \phi}$$

and $$\text{distance } b = a - \frac{1}{\tan \phi}\frac{w_0}{2} = \frac{w_1}{\sin \phi} - \frac{w_0'}{2 \tan \phi}$$

and $$\tan \alpha = \frac{b}{w_0/2} = \frac{2w_1}{w_0 \sin \phi} - \frac{1}{\tan \phi} \qquad (1)$$

Angle $\beta$ in terms of $\phi$ and $\alpha$ is found from triangle ABC as follows:

$$90 + \beta = \gamma + (90 - \delta)$$

or $$\beta = \gamma - \delta$$

At point B, from Snell's Law, $n_1 \sin \delta = n_0 \sin \alpha$ and from the angles at point C, $\phi + \gamma + (90 - \alpha) = 180°$ or $\gamma = 90° + \alpha - \phi$.

In combining the preceding equations, the expression for angle $\beta$ in terms of $\phi$ and $\alpha$ is $$\beta = 90° - \phi + \alpha - \sin^{-1}\left(\frac{n_0}{n_1} \sin \alpha\right) \qquad (2)$$

the maximum angle $\beta$ which will give total internal reflection at point A is given by $$n_1 \sin \beta = n_2 \qquad (3)$$

Therefore, the maximum angle, $\phi_{max}$, is given by combining the two previous equations;

$$\sin^{-1}\frac{n_2}{n_1} = 90° - \phi_{max} + \alpha - \sin^{-1}\left(\frac{n_0}{n_1} \sin \alpha\right) \qquad (4)$$

Equations 1 and 4 are simultaneous transcendental equations yielding the maximum angle ($\phi_{max}$) and angle $\alpha$ as functions of $n_0$, $n_1$, $n_2$, $w_0$, and $w_1$. Thus, any two of the parameters can be viewed as unknowns and solved for in terms of the other parameters.

From Equations 1 and 4 it will be found that total internal reflection in channel members 14.1 or 16.1 of light rays such as $R_1$ traveling toward junction 18.1 parallel to the axis of channel member 12.1 may be accomplished by meeting the following exemplary conditions:

*Example I*

$w_1 = w_0$
$n_0 = 2.14$
$n_1 = 2.14$
$n_2 = 1.510$
$\phi_{max} = 45°$
$\alpha = 39.6°$

*Example II*

$w_1 = w_0$
$n_0 = 1.46$
$n_1 = 1.755$
$n_2 = 1.510$
$\phi_{max} = 45°$
$\alpha = 39.6°$

*Example III*

$w_1 = 2w_0$
$n_0 = 1.60$
$n_1 = 1.755$
$n_2 = 1.520$
$\phi_{max} = 45°$
$\alpha = 58.9°$ It will be noted from the foregoing that, in the embodiments of the invention illustrated by FIGS. 2 and 3, light rays traveling parallel to the axes of the bases (channel members 12 or 12.1) are directed into the arms (channel members 14, 16 or 14.1, 16.1) so that in such arms they become the "critical" rays. In other words, they become the rays that strike the interface between the arms and their surrounding glasses at the critical angle of reflection. Thus, approximately one half of the light which enters the base (channel member 12 or 12.1) within its acceptance angle is lost at junction 18 or 18.1 as stray light not conducted by internal reflection beyond the member 12 or 12.1) may be determined from the well-known relationship $NA = \sqrt{n_1^2 - n_2^2}$ were NA is the numerical aperture of the base, $n_1$ is the refractive index of its core or channel glass and $n_2$ is the refractive index of the cladding or surrounding glass. The light acceptance angle of the base (channel member 12 or 12.1) is $2 \sin^{-1} NA$.

While the embodiments of the invention illustrated in FIGS. 2 and 3 have considerable utility in applications where simplicity of construction is paramount over the aforementioned loss of light, the present invention further contemplates the provision of light conducting Y junctions wherein the aforementioned change in direction of light rays at the optical junction may be avoided and light loss minimized.

This is illustrated in FIGS. 4, 5 and 6 of the drawing which depict alternative embodiments of the invention. In all such embodiments, light rays traveling parallel to the axis of the base of the Y and toward the junction thereof are turned at the junction so as to become parallel to the axes of the arms of the Y. Thus, axial and paraxial light rays entering a coupling 10 of the type illustrated in FIGS. 4, 5 or 6 will be turned in passing from one channel member to another so as to become similarly disposed in the other channel member thus becoming emitted from the coupling with substantially the same directivity as received.

The designs of junctions 18.2 and 18.3 in FIGS. 4 and 5 respectively accomplish such turning of the axial parallel light rays mainly by the principles of internal reflection while the design of junction 18.4 in FIG. 6 accomplishes the same by a combined effect of refraction and internal reflection.

Referring now to the embodiment of the invention illustrated in FIG. 4, it will be seen that the structure of junction 18.2 comprises, in addition to channel members 12.2, 14.2 and 16.2, a glass wedge 60. Channel members 12.2, 14.2 and 16.2 are formed of glass having an index of refraction $n_1$ surrounded by glass having an index of refraction $n_2$ lower than $n_1$. Wedge 60 is represented as having an index of refraction $n_3$. In this embodiment, $\phi$, which represents one half the included angle between channel members 14.2 and 16.2, accordingly also equals the angle through which a light ray such as $R_2$ is bent at junction 18.2. Light ray $R_2$, it is to be understood, is exemplary of rays of light which travel toward junction 18.2 in the base of the Y (channel member 12.2) parallel to its axis. Also in FIG. 4, the symbol $\theta$ represents one half the angle at the apex of wedge 60.

Accordingly, if a ray of light $R_2$ parallel to the axis of the base of Y junction 18.2 is to be reflected so that it becomes an axially parallel ray in an arm of the junction (channel member 16.2, for example), its new direction will make an angle $\phi$ with the original direction and $\phi = 2\theta$. Then, $n_3 \leq n_1 \cos \theta$.

Thus, for example, if $\phi = 45°$ and $n_1 = 1.70$, then $n_3 \leq 1.57$. If, however, $\phi = 30°$, $n_3$ may be as high as 1.642.

From the foregoing, it can be seen that conditions are provided for in the embodiment of the invention illustrated by FIG. 4 which cause rays of light passing through junction 18.2 into channel members 14.2 and/or 16.2 to be turned so that they assume substantially the same directions relative to their respective channel member axis as they had in the base (channel member 12.2). Thus, it becomes possible for a plurality of such Y junction devices to be connected in series in an optical circuitry without loss of light due to change in direction of its axial rays. Also, light rays $R_a$ traveling toward junction 18.2 in either or both of channel members 14.2 and 16.2 will become similarly directed into channel member 12.2. However, from the relationship $$n_3 = n_2 \cos \frac{\phi}{2} - \sqrt{n_1^2 - n_2^2} \sin \frac{\phi}{2}$$

which determines the index of refraction $n_3$ required of wedge 60 for reflecting a ray such as $R_3$ at the critical angle of reflection in the base (channel member 12.2), it will be found that $n_3$ would be required to be of a lesser value than that required to satisfy the aforementioned conditions for turning axially parallel rays. For example, using the same exemplary values for $n_1$ and $\phi$ as above (i.e., $n_1 = 1.70$ and $\phi = 45°$), it will be found that for critical ray $R_3$ to become reflected by wedge 60, the refractive index of wedge 60 would have to be approximately 1.13. Accordingly, in the embodiment of the invention illustrated in FIG. 4, light rays traveling toward junction 18.2 in the base (channel member 12.2) along paths at or near the critical angle of reflection will not be reflected into the arms (channel members 14.2 and 16.2).

Having utility in applications where control of the directivity of light rays in base and arms is paramount and loss of light rays at and near critical angles of reflection in the base is of lesser or no concern, the embodiment of FIG. 4 may be substituted for any one of the previously described embodiments of coupler 10 in an optical circuitry.

A modification of the FIG. 4 embodiment of the invention is illustrated in FIG. 5 wherein Y junction 18.3 is formed with its base (channel member 12.3) having a different index of refraction $n_4$ that its arms (channel members 14.3 and 16.3). In such construction, greater amounts of light rays traveling toward junction 18.3 along paths near the critical angle of reflection in either the base or arms are reflected by wedge 60.1 respectively into the arms or base. This results from refraction of the light rays taking place in passing from the base (channel member 12.3) into an arm (channel member 14.3 or 16.3) or vice versa. By such refraction, a light ray $R_4$, for example, is cause to strike wedge 60.1 at greater than usual angles of incidence $\beta$ so that, as illustrated in FIG. 5, it may be reflected from wedge 60.1 into an arm of junction 18.3.

In order to achieve the aforementioned refraction at the interface between the base (channel member 12.3) and arms (channel members 14.3 and 16.3), refractive index $n_4$ of the base must be of a lower value than that of the arms. Thus, the numerical aperture (NA) of the base become reduced accordingly which, for certain applications in optical circuitry may not be of paramount importance or concern.

In the embodiment of the invention illustrated in FIG. 6, however, Y junction 18.4 is designed so as to preserve the roles of both axial and critical rays of light in their transmission from base to arm or vice versa. That is to say, substantially all rays of light entering either the base (channel member 12.4) or an arm (channel member 14.4 or 16.4 of junction 18.4 within the light acceptance or aperture angle of the particular base or arm will be transferred from one to the other with substantially no loss thereof. Furthermore, axial light rays and those parallel to an axis of the base or a particular arm will be transferred from one to the other in such manner as to assume the same directivity after passing through junction 18.4.

Junction 18.4 comprises, in addition to the base and arms (channel members 12.4 and 14.4, 16.4), wedge 60.2 and intermediate arms 62.

Parameters principally involved in the design of junction 18.4 are designated as follows:

$n_1$ = refractive index of base and arms (channel members 12.4, 14.4 and 16.4).
$n_2$ = refractive index of the material surrounding junction 18.4.
$n_3$ = refractive index of wedge 60.2.
$n_4$ = refractive index of intermediate arms 62.
$\gamma$ = ½ the apex angle of the base (channel member 12.4).
$\theta$ = ½ the apex angle of wedge 60.2.
$\rho$ = the angle between the interface of wedge 60.2 and intermediate arm 62 and the interface between intermediate arm 62 and channel 14.4.
L = the legth of each intermediate arm 62.

Angles of incidence, refraction and reflection are indicated by symbols $\alpha$, $\delta$ and $\beta$ respective. Subscripts $a$ and $c$ are used with such symbols in referring specifically to exemplary light rays $R_5$ and $R_6$ respectively. $R_5$ represents a light ray traveling toward junction 18.4 parallel to the axis of channel member 12.4 and $R_6$ represents a light ray reflecting from the interface between channel member 12.4 and its surrounding glass at the critical angles.

In the design of junction 18.4 for given values of $n_1$, $n_2$, $n_4$ and a chosen angle $\gamma$, values of $\theta$, $\rho$ and $n_3$ are found from the following equations wherein it has been determined that:

$$\theta = 90 + \alpha_a - \delta_c - \beta_c$$

$$\rho = \beta_c + \sigma_c$$

and $$n_3 \leq n_4 \sin \beta_c$$

The symbols $\sigma_c$ and $\sigma_a$ represent the angles of incidence of rays $R_6$ and $R_5$ respectively at the interface between intermediate arm 62 and channel member 14.4.

Using the same values as were used to illustrate parameters involved in the construction of the previously described embodiments of the invention, namely $n_1=1.57$, $n_2=1.53$, $n_4=1.70$ and $\phi=45°$, it will be found that with $\gamma$ equal to 45°, $\theta$ must be 23.5°, $\rho=97.45°$ and $n_3 \leqslant 1.47$.

If, however, $\gamma$ is chosen to be 30° it will be required that $\theta=25.7°$, $\rho=97.6°$ and $n_3 \leqslant 1.50$.

The length L of intermediate arm 62, being the remaining parameter, is determined as follows with reference being made to FIG. 7. In FIG. 7 junction 18.4 is illustrated as having an angle $\gamma$ of 30° at the apex of its base (channel member 12.4) and the symbol $a$ equals one half the width of the base (channel member 12.4).

The angle of incidence of a critical ray $R_7$ striking the interface between the base and intermediate arm 62 is $$\alpha_a - (\alpha_c - \alpha_a) \text{ or } 2\alpha_a - \alpha_c$$

Angle $\zeta$ is given by:

$$\zeta = \alpha_a - \sin^{-1}\left[\frac{n_1}{n_4} \sin(2\alpha_a - \alpha_c)\right]$$

so that angle $\tau = 180 - (180 - \gamma - \theta) - \zeta$ or $\tau = \gamma + \theta - \zeta$.

Thus, the length L of the interface between the high refractive index material $n_4$ of intermediate arm 62 and the lower refractive index material $n_3$ of wedge 60.2 is:

$$L = \sin \zeta \frac{a}{\frac{\sin \gamma}{\sin \tau}}$$

or $$L = a \frac{\sin \zeta}{\sin \gamma \sin \tau} = a \frac{\sin \zeta}{\sin \gamma \sin (\gamma + \theta - \zeta)}$$

Accordingly for the above given example where $\gamma=30°$, it will be found that $\zeta=47.5°$ and $L=10.34a$.

In FIG. 6, $R_8$ and $R_9$ represent axial and critical rays respectively propagating from arm 16.4 to base 12.4. Similar rays caused to enter arm 14.4 will also become directed into base 12.4. Thus, it can be seen that light rays directed toward junction 18.4 through arms 14.4 and 16.4 will combine at the junction while, as already mentioned, light rays directed toward junction 18.4 through base 12.4 will divide at the junction.

It should be understood that in all instances where values have been set forth hereinabove, such values are used only for exemplification and are not to be interpreted as restrictive of the invention.

We claim:

1. In an optical device comprised of three long and thin light-conducting channel members disposed triaxially in a Y formation wherein ends of said members at the junction of said formation are optically interconnected for conducting light from one to another through said junction, the improvement comprising:
    said members of the formation being of a preselected high index of refraction;
    a material of lower refractive index than that of said members disposed therebetween and extending along a substantial portion of the lengths of walls of said members from said junction, said material being fused to said walls and forming an internally light-reflecting interface therealong; and
    said material including a wedge portion between two of said members adjacent said junction, said wedge portion being of a preselected lower index of refraction than that of the remainder of said material whereby axial and paraxial light rays received and conducted through one of said channel members will each be turned upon passing through said junction in such a manner as to be received by another of said members with substantially the same directivity relative to said other member as initially received relative to said one member.

2. An optical device according to claim 1 wherein said one channel member is of a lower index of refraction than that of either of the other channel members.

3. An optical device according to claim 1 wherein said junction includes a pair of intermediate arms of light-conducting material each extending from one end of one channel member to and in optically interconnected relationship with one end of another channel member.

4. An optical device according to claim 3 wherein said wedge portion extends along substantially the full length of each of said intermediate arms and forms an interface therealong which is internally reflective to light directed into said arms from said one end of said one channel member.

5. An optical device according to claim 3 wherein said intermediate arms are formed of a material having a higher refractive index than that of said channel members.

6. An optical device according to claim 5 wherein said wedge portion has an index of refraction lower than that of any one of said intermediate arms and channel members.

References Cited

UNITED STATES PATENTS

| | | |
|---|---|---|
| 2,367,858 | 1/1945 | Flynn. |
| 2,881,976 | 4/1959 | Greanias _____ 350—96 X |
| 3,237,039 | 2/1966 | Fyler _____ 350—96 X |
| 3,320,013 | 5/1967 | Johnson _____ 350—169 X |

JOHN K. CORBIN, *Primary Examiner.*

U.S. Cl. X.R.

350—171